US012725928B2

(12) United States Patent
Kwak et al.

(10) Patent No.: US 12,725,928 B2
(45) Date of Patent: Sep. 1, 2026

(54) MIMO ANTENNA WITH IMPROVED STANDING WAVE RATIO CHARACTERISTICS

(71) Applicant: ACE TECHNOLOGIES CORPORATION, Incheon (KR)

(72) Inventors: Byung Hwa Kwak, Incheon (KR); Tae Hwan Heo, Anyang-si (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 0 days.

(21) Appl. No.: 18/913,047

(22) Filed: Oct. 11, 2024

(65) Prior Publication Data

US 2025/0038410 A1 Jan. 30, 2025

Related U.S. Application Data

(63) Continuation of application No. PCT/KR2023/003388, filed on Mar. 14, 2023.

(30) Foreign Application Priority Data

Apr. 14, 2022 (KR) ........................ 10-2022-0046398

(51) Int. Cl.
*H01Q 7/00* (2006.01)
*H01Q 1/48* (2006.01)

(52) U.S. Cl.
CPC ................. *H01Q 7/00* (2013.01); *H01Q 1/48* (2013.01)

(58) Field of Classification Search
CPC .................................. H01Q 7/00; H01Q 1/48
(Continued)

(56) References Cited

U.S. PATENT DOCUMENTS 7,498,995 B2 * 3/2009 Kim ....................... H01Q 21/28 343/770
8,803,742 B2 8/2014 Sharawi et al.
(Continued)

FOREIGN PATENT DOCUMENTS

KR 10-2011-0121792 A 11/2011
KR 10-2012-0037763 A 4/2012
(Continued)

OTHER PUBLICATIONS

International Search Report for PCT International Application No. PCT/KR2023/003388 issued on Jun. 21, 2023.
(Continued)

*Primary Examiner* — Dameon E Levi

(57) ABSTRACT

A MIMO antenna comprises: a substrate; a first feed line and a second feed line formed on the front side of the substrate and spaced apart from each other; a first radiator receiving a feed signal from the first feed line; a second radiator spaced apart from the first radiator by a predetermined distance and receiving a feed signal from the second feed line; a first ground pattern surrounding the first feed line, electrically connected to the ground, and extending in the longitudinal direction of the substrate; a second ground pattern spaced apart from the first ground pattern by a predetermined distance, surrounding the second feed line, electrically connected to the ground, and extending in the longitudinal direction of the substrate; a first connection line connecting the first ground pattern and the second ground pattern in an area adjacent to the first longitudinal ends of the first ground pattern and the second ground pattern.

7 Claims, 7 Drawing Sheets

(58) Field of Classification Search
USPC .......................................................... 343/742
See application file for complete search history.

(56) References Cited

U.S. PATENT DOCUMENTS

| | | | | |
|---|---|---|---|---|
| 9,496,614 | B2 * | 11/2016 | Bringuier | H01Q 21/30 |
| 11,581,650 | B2 * | 2/2023 | Wu | H01Q 21/28 |
| 11,984,673 | B2 * | 5/2024 | Koo | H01Q 9/40 |
| 2009/0009400 | A1 | 1/2009 | Kim et al. | |
| 2015/0295311 | A1 * | 10/2015 | Bringuier | H01Q 1/521<br>343/729 |
| 2018/0076376 | A1 * | 3/2018 | Brady | H01Q 1/48 |
| 2022/0320738 | A1 * | 10/2022 | Koo | H01Q 1/521 |

FOREIGN PATENT DOCUMENTS

| | | | | | |
|---|---|---|---|---|---|
| KR | 101166090 | B1 | * | 7/2012 | |
| KR | 10-2012-0113832 | A | | 10/2012 | |
| KR | 20120113832 | A | * | 10/2012 | H01Q 1/46 |
| KR | 10-2013-0025571 | A | | 3/2013 | |
| KR | 10-2016-0061770 | A | | 6/2016 | |
| KR | 101917905 | B1 | * | 11/2018 | |
| KR | 10-2093204 | B1 | | 3/2020 | |
| WO | 2021-100924 | A1 | | 5/2021 | |

OTHER PUBLICATIONS

Written Opinion of the International Searching Authoriity of PCT/KR2023/003388 issued on Jun. 21, 2023.

Examination report under sections 12 & 13 of the Patents Act, 1970 and the Patents Rules, 2003, from Intellectual Property INDIA for Patent Application No. 202447076871 issued on May 12, 2026.

* cited by examiner

MIMO ANTENNA WITH IMPROVED STANDING WAVE RATIO CHARACTERISTICS

CROSS-REFERENCE TO RELATED APPLICATIONS

This application is a continuation of pending PCT International Application No. PCT/KR2023/003388, which was filed on Mar. 14, 2023, and which claims the benefit of priority to Korean Patent Application No. 10-2022-0046398 filed on Apr. 14, 2022. The entire contents of the aforementioned patent applications are incorporated herein by reference.

BACKGROUND

1. Technical Field

The present disclosure relates to a MIMO antenna, and more particularly, to a MIMO (multiple-input and multiple-output) antenna with improved standing wave ratio characteristics.

2. Description of the Related Art

Mobile communication systems are developing at a very rapid pace. In the early stages of mobile communication, communication services inside the building were provided through outdoor repeaters. In this case, it was difficult to provide a high-quality service due to the high signal loss caused by the walls of the building. In particular, in order to solve the problem of high traffic capacity occurring in indoor communication environments such as shopping centers, buildings, and stadiums, many different studies have been conducted.

With the recent rapid increase in the number of mobile communication subscribers, the communication quality inside the building continues to become a problem. Accordingly, repeaters are used to solve the problem of high traffic capacity occurring in indoor communication environments and effectively eliminate communication shadow areas. In high frequency bands, the dependency on repeaters is increasing because the signal attenuation phenomenon is severe and it is vulnerable to penetration.

However, since these repeaters are often installed indoors, they have narrow structures, and the repeater antennas also have narrow structures. It was difficult to secure good standing wave ratio characteristics while securing wideband characteristics with narrow antennas. In particular, there was a problem that the radiation performance was degraded in the low frequency band due to the degraded standing wave ratio characteristics.

SUMMARY OF THE INVENTION

The present disclosure proposes a MIMO antenna capable of stabilizing radiation pattern and standing wave ratio characteristics by improving current flow.

In addition, the present disclosure proposes a MIMO antenna capable of radiating a stable radiation pattern while maintaining wideband characteristics in a narrow size.

According to one aspect of the present disclosure to achieve the above-mentioned objects, a MIMO antenna is provided, which comprises: a substrate; a first feed line and a second feed line formed on the front side of the substrate and spaced apart from each other; a first radiator receiving a feed signal from the first feed line; a second radiator spaced apart from the first radiator by a predetermined distance and receiving a feed signal from the second feed line; a first ground pattern surrounding the first feed line, electrically connected to the ground, and extending in the longitudinal direction of the substrate; a second ground pattern spaced apart from the first ground pattern by a predetermined distance, surrounding the second feed line, electrically connected to the ground, and extending in the longitudinal direction of the substrate; a first connection line connecting the first ground pattern and the second ground pattern in an area adjacent to the first longitudinal ends of the first ground pattern and the second ground pattern.

The MIMO antenna further includes a first protrusion pattern protruding in the longitudinal direction of the first ground pattern from a first longitudinal end of the first ground pattern, and a second protrusion pattern protruding in the longitudinal direction of the second ground pattern from a first longitudinal end of the second ground pattern.

The MIMO antenna further includes a second connection line connecting the first protrusion pattern and the second protrusion pattern.

An electrical loop is formed by the first connection line and the second connection line.

The MIMO antenna further includes a connection element having a length of $\lambda/2$, electrically connecting the first radiator and the second radiator.

On the rear side of the said substrate, a first feed point connected to the first feed line through a first via hole and a second feed point connected to the second feed line through a second via hole are formed.

According to another aspect of the present disclosure, a MIMO antenna is provided, characterized by including: a substrate; a first feed line and a second feed line formed on the front side of the substrate and spaced apart from each other; a first radiator receiving a feed signal from the first feed line; a second radiator spaced apart from the first radiator by a predetermined distance and receiving a feed signal from the second feed line; a first ground pattern surrounding the first feed line, electrically connected to the ground, and extending in the longitudinal direction of the substrate; a second ground pattern spaced apart from the first ground pattern by a predetermined distance, surrounding the second feed line, electrically connected to the ground, and extending in the longitudinal direction of the substrate; a first connection line connecting the first ground pattern and the second ground pattern; and a second connection line connecting the first ground pattern and the second ground pattern and formed lower than the first connection line.

The antenna according to the embodiment of the present disclosure has the advantage of being able to stabilize the radiation pattern and standing wave ratio characteristics by improving the current flow.

In addition, the antenna according to the embodiment of the present disclosure has the advantage of being able to radiate a stable radiation pattern while maintaining wideband characteristics with a narrow size.

DETAILED DESCRIPTION OF THE INVENTION

Figure 1:
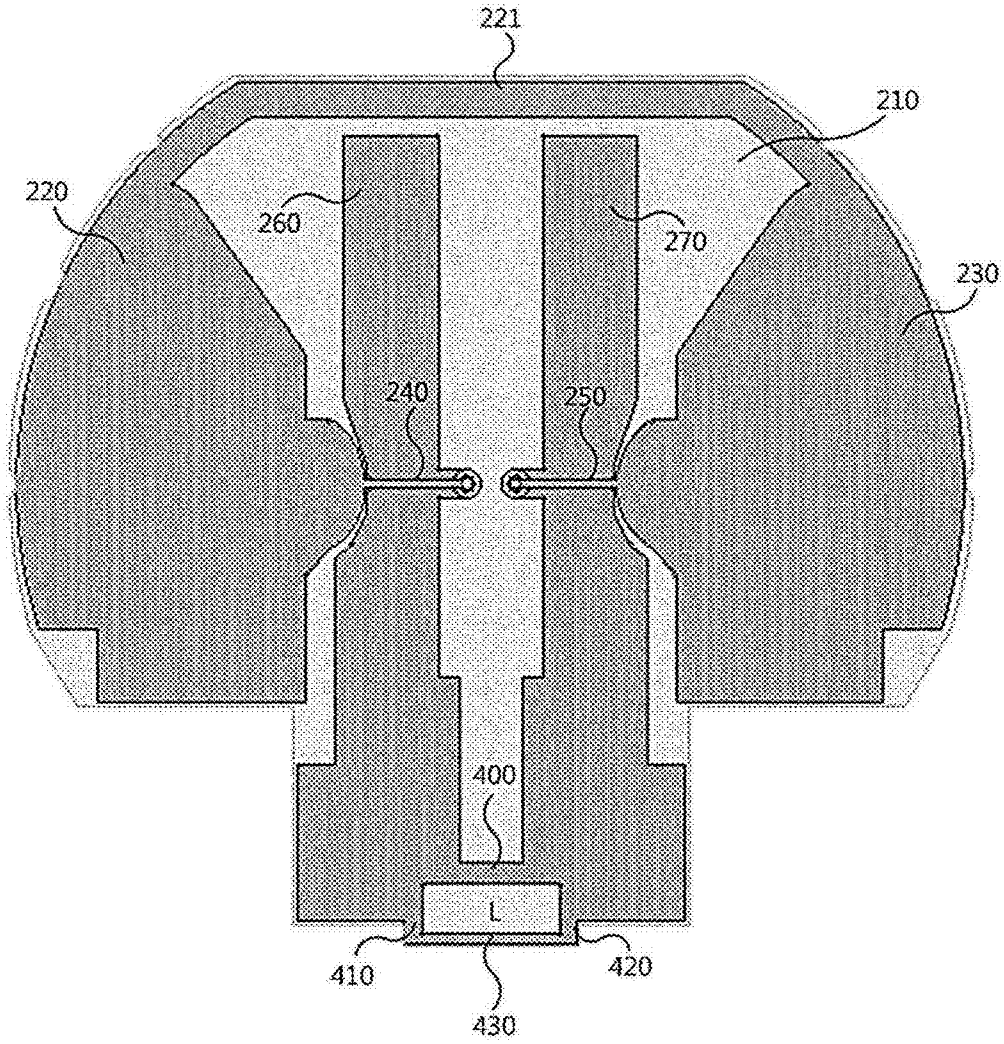
FIG. 1 is a drawing showing the front side of a MIMO antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
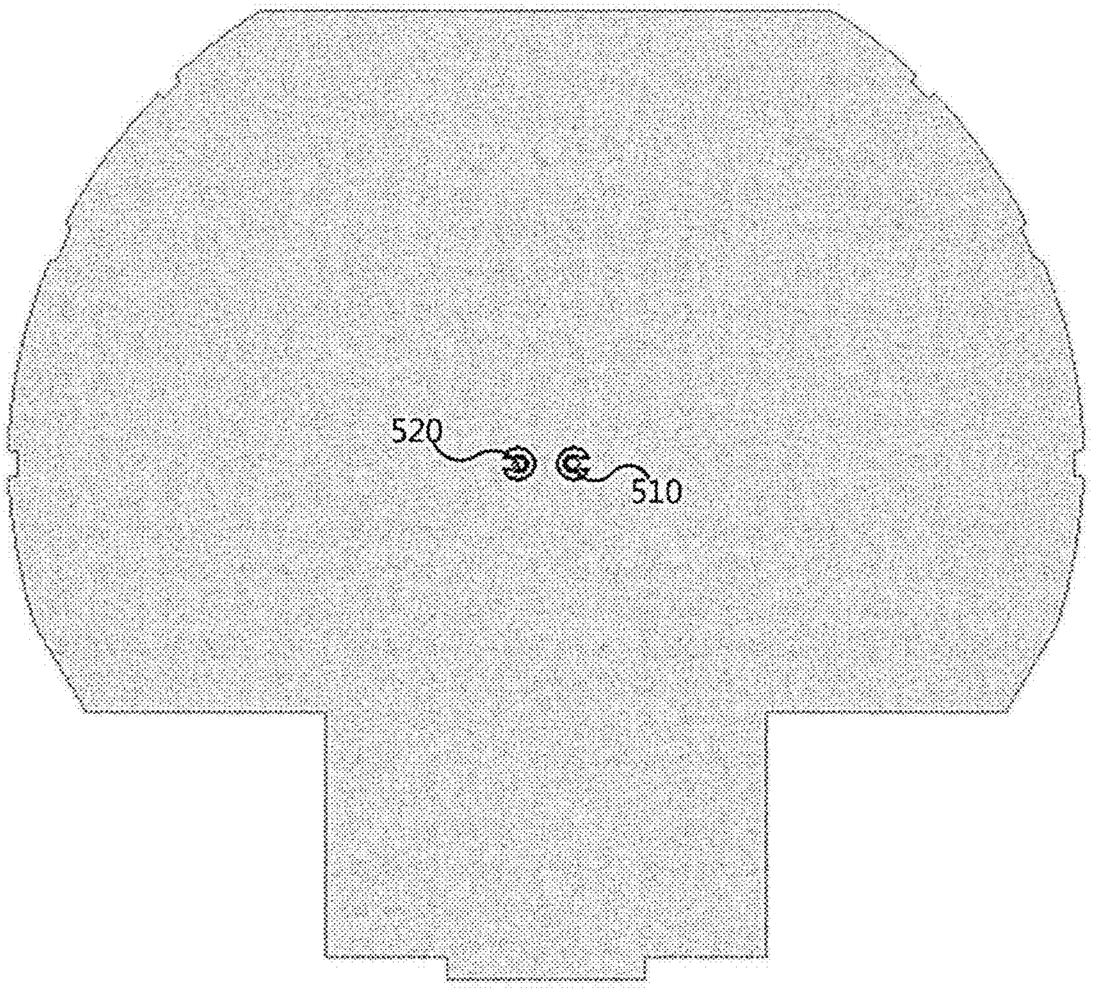
FIG. 2 is a drawing showing the rear side of a MIMO antenna according to an embodiment of the present disclosure.

FIG. 1 is a drawing showing the front side of a MIMO antenna according to an embodiment of the present disclosure, and FIG. 2 is a drawing showing the rear side of a MIMO antenna according to an embodiment of the present disclosure.

Referring to FIGS. 1 and 2, a MIMO antenna according to one embodiment of the present disclosure includes: a substrate 210; a first radiator 220; a second radiator 230; a first feed line 240; a second feed line 250; a first ground pattern 260; a second ground pattern 270; a first protrusion pattern 410; a second protrusion pattern 420; and a first connection line 400.

An antenna according to one embodiment of the present disclosure is formed on a substrate 210 and is formed in the form of a metal pattern on the front and rear sides of the substrate 210. The substrate 210 may be made of a dielectric material, and it will be apparent to those skilled in the art that various materials may be applied to the substrate.

A MIMO antenna according to one embodiment of the present disclosure includes two radiators 220 and 230, and a first feed line 240 and a second feed line 250 are formed corresponding to each radiator 220 and 230. The first feed line 240 provides a feed signal to the first radiator 220, and the second feed line 250 provides a feed signal to the second radiator 230. An antenna according to one embodiment of the present disclosure is a MIMO antenna in which signals are radiated from two radiators 220 and 230, and a feed signal is independently provided to each radiator 220 and 230, and each radiator 220 and 230 independently receives a signal.

The first radiator 220 and the second radiator 230 are arranged spaced apart on both sides of the front surface of the substrate 210. The first radiator 220 and the second radiator 230 have an asymmetrical structure vertically based on their contact points with the first feed line 240 and the second feed line 250, respectively.

Preferably, the first radiator 220 and the second radiator 230 are set such that the area of the upper region is larger than the area of the lower region based on the first feed line 240 and the second feed line 250, respectively.

The first radiator 220 and the second radiator 230 may be implemented with various conductive materials and may be patterned on the substrate 210 as described above.

Each of the first radiator 220 and the second radiator 230 receives a feed signal from the first feed line 240 and the second feed line 250, and the first feed line 240 and the second feed line 250 are electrically coupled to feed points formed on the rear surface of the substrate 210 to provide a feed signal.

According to a preferred embodiment of the present disclosure, the first radiator 220 and the second radiator 230 are connected to each other through a connection element 221. The connection element 221 connects the large areas of the first radiator 220 and the second radiator 230 which have asymmetrical sizes with respect to the feed lines.

The connection element 221 may have a length of, for example, $\lambda/2$. The connection element 221 is formed to connect two radiators to improve the isolation characteristics between the first radiator 220 and the second radiator 230. Since the antenna according to one embodiment of the present disclosure is a MIMO antenna in which two radiators 220 and 230 are arranged adjacent to each other, interference between the radiators may occur.

When the connection element 221 connecting the first radiator 220 and the second radiator 230 has a length of $\lambda/2$, an effect similar to the current path between the two radiators 220 and 230 being blocked from each other can be exerted. Due to such a connection element 221, even if the two adjacent radiators 220 and 230 are arranged at a distance of $\lambda/4$ or less, good isolation characteristics can be secured. In other words, it is possible to secure good radiation characteristics while miniaturizing the size of the antenna.

Meanwhile, a first ground pattern 260 adjacent to the first radiator 220 and a second ground pattern 270 adjacent to the second radiator 230 are formed on the front surface of the substrate 210. The first ground pattern 260 and the second ground pattern 270 are electrically connected to the ground.

The first ground pattern 260 has a structure that extends in the length direction of the substrate while surrounding the first feed line 240, and the second ground pattern 270 has a structure that extends in the length direction of the substrate while surrounding the second feed line 250. It is preferable that the first ground pattern 260 and the second ground pattern 270 are spaced apart from each other and have a left-right symmetrical structure.

The first ground pattern 260 surrounds the first feed line 240 and allows the first feed line 240 to provide a feed signal in the CPW manner. In addition, the second ground pattern 270 surrounds the second feed line 250 and allows the second feed line to provide a feed signal in the CPW manner.

The present disclosure improves isolation characteristics by positioning two ground patterns between two radiators

220 and 230 and suppressing interference between radiators occurring in a MIMO antenna through a connection element 221.

The first ground pattern 260 and the second ground pattern (270) may have partially different widths, and the widths of the first ground pattern 260 and the second ground pattern 270 may be appropriately adjusted based on the required impedance matching characteristics.

According to a preferred embodiment of the present disclosure, a first connection line 400 connecting the first ground pattern 260 and the second ground pattern 270 is formed in an area adjacent to the first longitudinal ends of the first ground pattern 260 and the second ground pattern 270. The first ground pattern 260 and the second ground pattern 270 are electrically connected by the first connection line 400, and a current path is formed between the first ground pattern 260 and the second ground pattern 270. Here, a second longitudinal end means a longitudinal end adjacent to the connection element 221, and the first longitudinal end means a longitudinal end opposite to the second longitudinal end.

A first protrusion pattern 410 is formed that protrudes in the length direction of the first ground pattern 260 from the first longitudinal end of the first ground pattern 260. In addition, a second protrusion pattern 420 is formed that protrudes in the length direction of the second ground pattern 270 from the first longitudinal end of the second ground pattern 270. It is preferable that the first protrusion pattern 410 and the second protrusion pattern 420 have a left-right symmetrical structure.

According to a preferred embodiment of the present disclosure, a second connection line 430 is formed that connects longitudinal ends of the first protrusion pattern 410 and the second protrusion pattern 420. The second connection line 430 together with the first connection line 400 electrically connects the first ground pattern 260 and the second ground pattern 270. The first connection line 400 and the second connection line 430 are arranged in parallel with each other.

A loop L is defined by the first connection line 400, the first protrusion pattern 410, the second protrusion pattern 420, and the second connection line, and the current path formed by the loop L improves the radiation characteristics of the MIMO antenna of the present disclosure. The MIMO antenna of the present disclosure is a small-sized antenna patterned on a substrate 210 but is an antenna that radiates wideband characteristics. When a thin film antenna patterned on a substrate 210 is designed to have wideband characteristics, it has a problem of having a high standing wave ratio, especially in a low-frequency band. When it has a high standing wave ratio, the ratio of a signal to be radiated to a feed line being reflected back to the feed line increases, which reduces the radiation efficiency.

In an embodiment of the present disclosure, by connecting the two connection lines 400 and 430 and forming a new current path through a loop defined by the two connection lines, the current flow is improved and the standing wave ratio is improved.

Meanwhile, in FIG. 1, a case is illustrated where a second connection line 430 is connected to the longitudinal ends of the first protrusion pattern 410 and the second protrusion pattern 420, but the second connection line 430 may also be formed to connect the two ground patterns 260 and 270 to each other. Even when the protrusion patterns 410 and 420 are not formed, the second connection line 430 is positioned lower than the first connection line 400, and a loop is formed by the first connection line 400, the two ground patterns, and the second connection line 430.

Referring to FIG. 2, two feed points 510 and 520 are formed in a MIMO antenna according to one embodiment of the present disclosure. The two feed points 510 and 520 are respectively connected to the terminals of the first feed line 240 and the second feed line 250 through via holes in the substrate. The first feed point 510 may be connected to the terminal of the first feed line 240 through a via hole, and the second feed point 520 may be connected to the terminal of the second feed line 250 through a via hole.

The first feed point 510 may be coupled with an external feed line, for example, the external feed line may include, but is not limited to, a coaxial cable. The second feed point 520 may also be coupled with an external feed line.

The signals fed to the first feed point 510 and the second feed point 520 may be the same signal or different signals may be fed.

Figure 3:
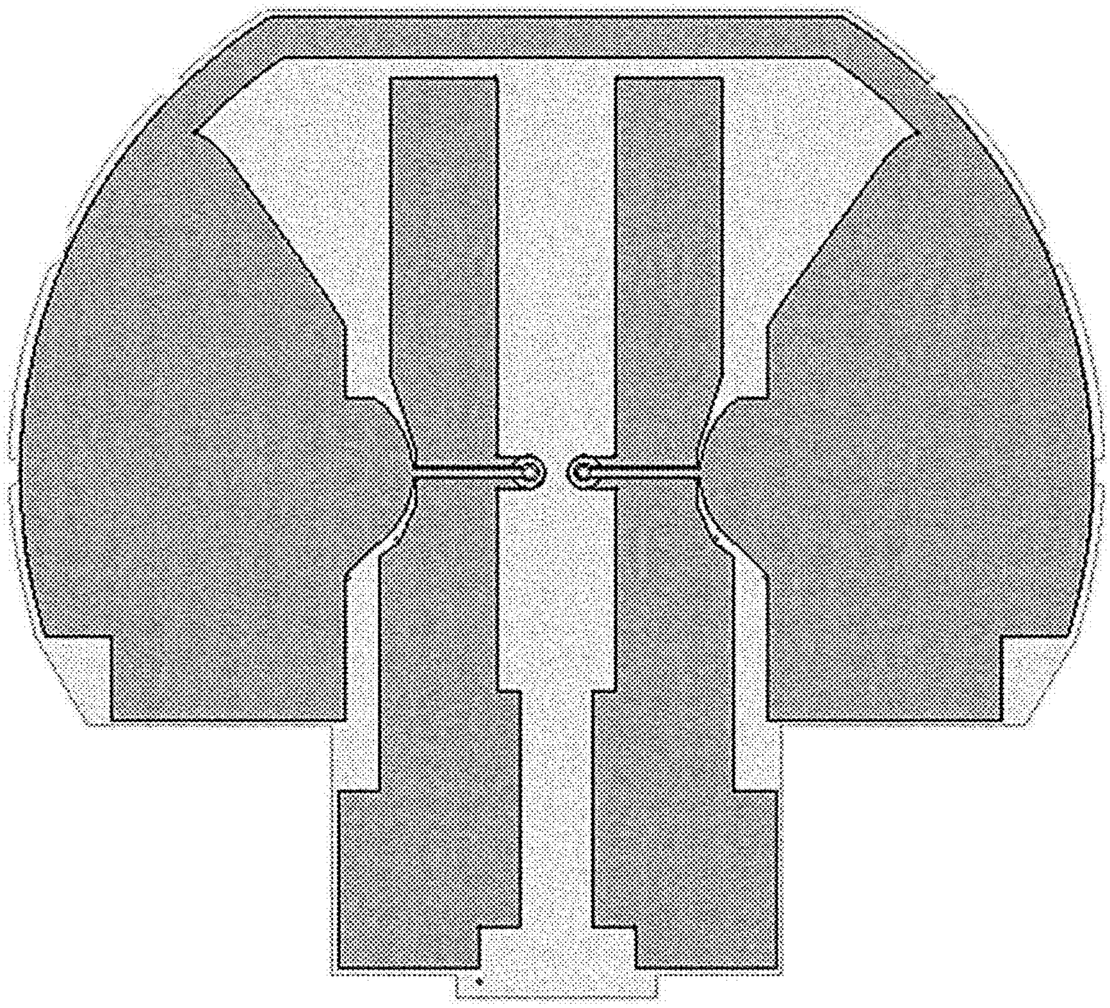
FIG. 3 is a drawing showing the structure of a first reference antenna for comparison with the present disclosure.

FIG. 3 is a drawing showing the structure of a first reference antenna for comparison with the present disclosure.

Referring to FIG. 3, the first reference antenna for comparison with the present disclosure is different from the present disclosure in that the first connection line 400 and the second connection line 430 of the present disclosure are omitted, and the structure of the radiator, ground pattern, and connection element itself is the same as that of the present disclosure.

When the connection lines are omitted as in FIG. 3, the first ground pattern and the second ground pattern are not connected on the substrate. The first reference antenna having the structure as in FIG. 3 can secure wideband characteristics itself, but does not have good impedance matching characteristics, and especially, the impedance matching characteristics deteriorate due to the high standing wave ratio in the low-frequency band.

Figure 4:
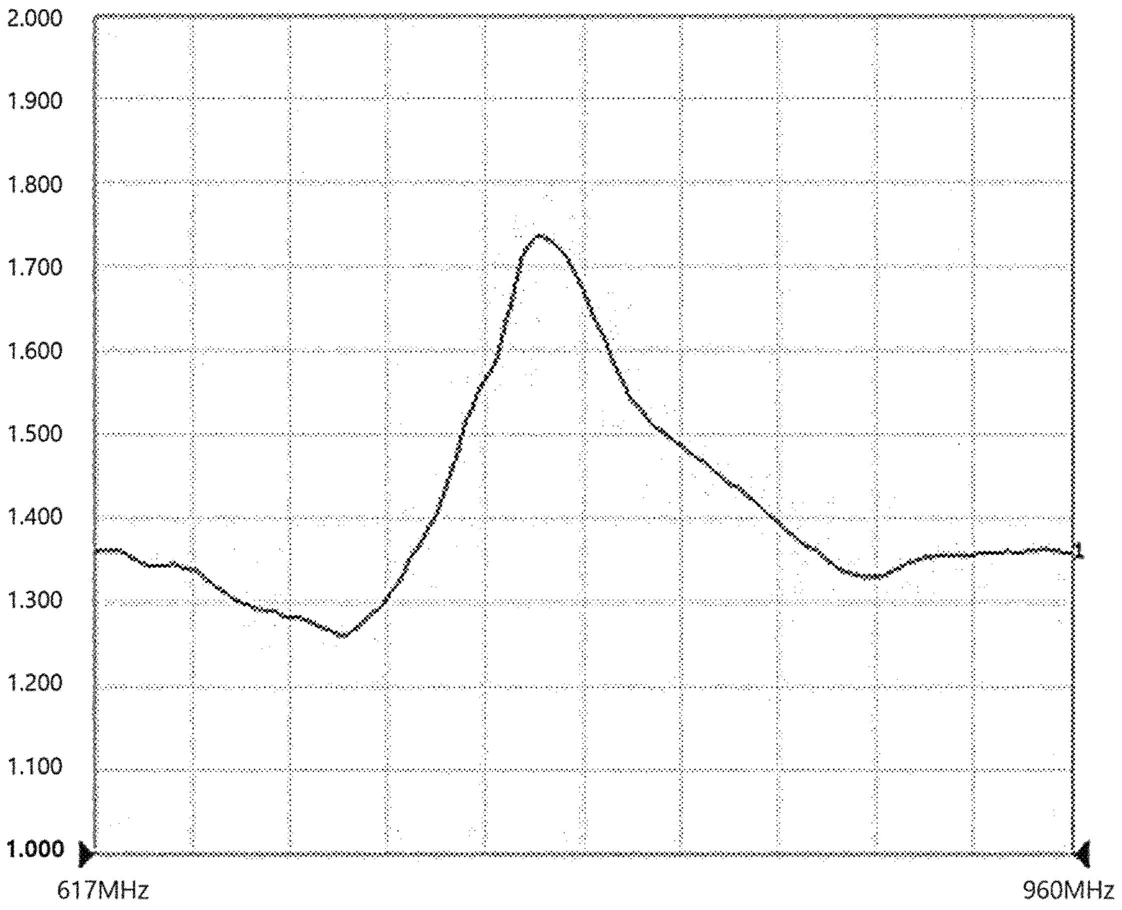
FIG. 4 is a graph showing the S11 parameter of the first reference antenna.
Figure 5:
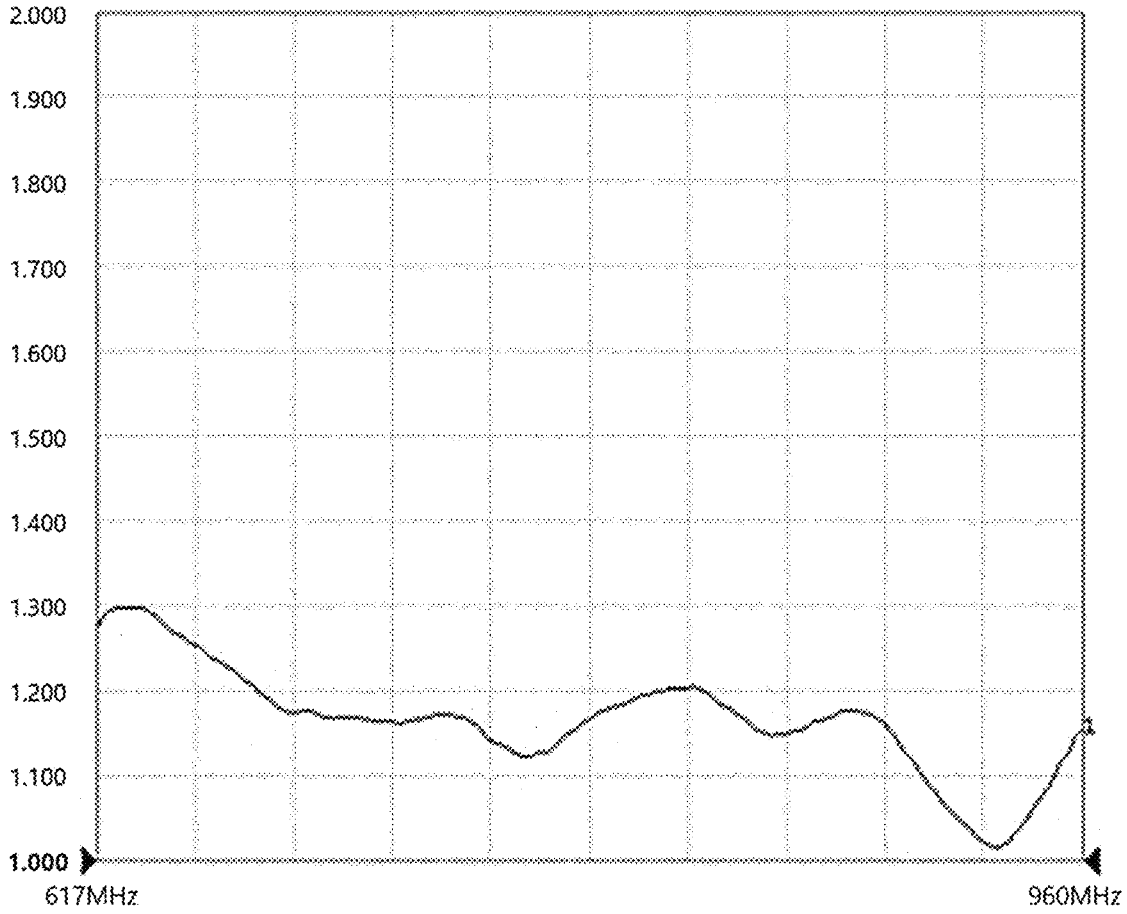
FIG. 5 is a graph showing the S11 parameter of the MIMO antenna according to an embodiment of the present disclosure.

FIG. 4 is a graph showing the S11 parameter of the first reference antenna, and FIG. 5 is a graph showing the S11 parameter of the MIMO antenna according to an embodiment of the present disclosure. FIG. 4 is a graph showing the S11 parameter of the low-frequency band among the radiation bands of the reference antenna, and FIG. 5 is also a graph showing the S11 parameter of the low-frequency band among the radiation bands of the antenna of the present disclosure.

Referring to FIG. 4, it can be seen that the first reference antenna has an overall high value of S11 due to a high standing wave ratio and its impedance matching is not good.

However, referring to the graph of FIG. 5, it can be seen that the S11 has an overall low value due to the low standing wave ratio, and good impedance matching is achieved compared to FIG. 4.

Figure 6:
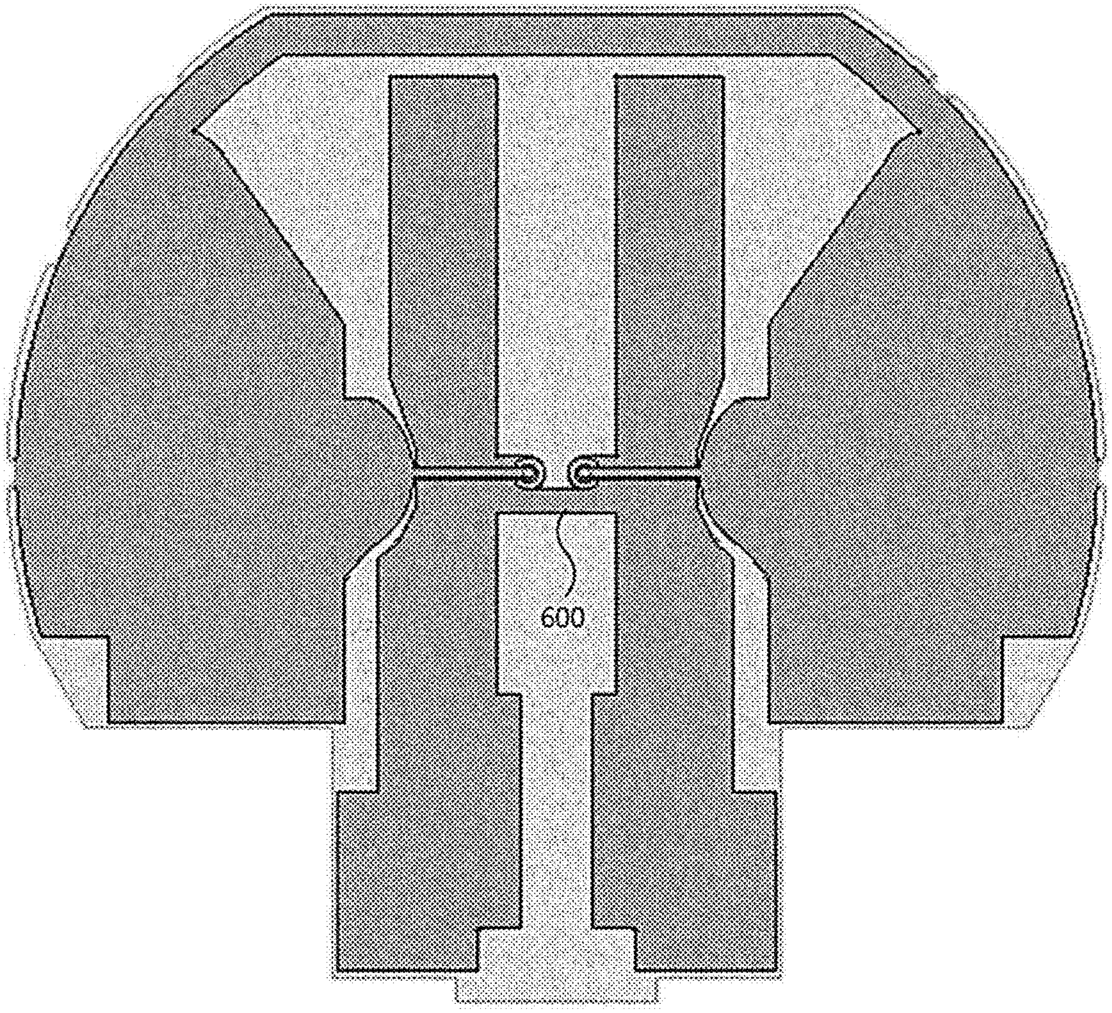
FIG. 6 is a drawing showing the structure of a second reference antenna for comparison with the present disclosure.

FIG. 6 is a drawing showing the structure of a second reference antenna for comparison with the present disclosure.

Referring to FIG. 6, the second reference antenna for comparison with the present disclosure includes only one connection line 600, and the connection line 600 is formed at the middle portion rather than the longitudinal end portion of the ground pattern.

When connecting the connection line to the middle portion of the ground pattern as in the second reference antenna, the first ground pattern and the second ground pattern can be electrically connected on the substrate. However, if only one connection line 600 is connected to the middle portion of the ground pattern, it is impossible to form a good impedance matching by lowering the standing wave ratio.

If only one connection line is formed, a loop defined by two protrusion patterns and a second connection line as in the present disclosure is not formed, and improvement of current flow cannot be achieved with only the connection line formed at the middle portion.

Figure 7:
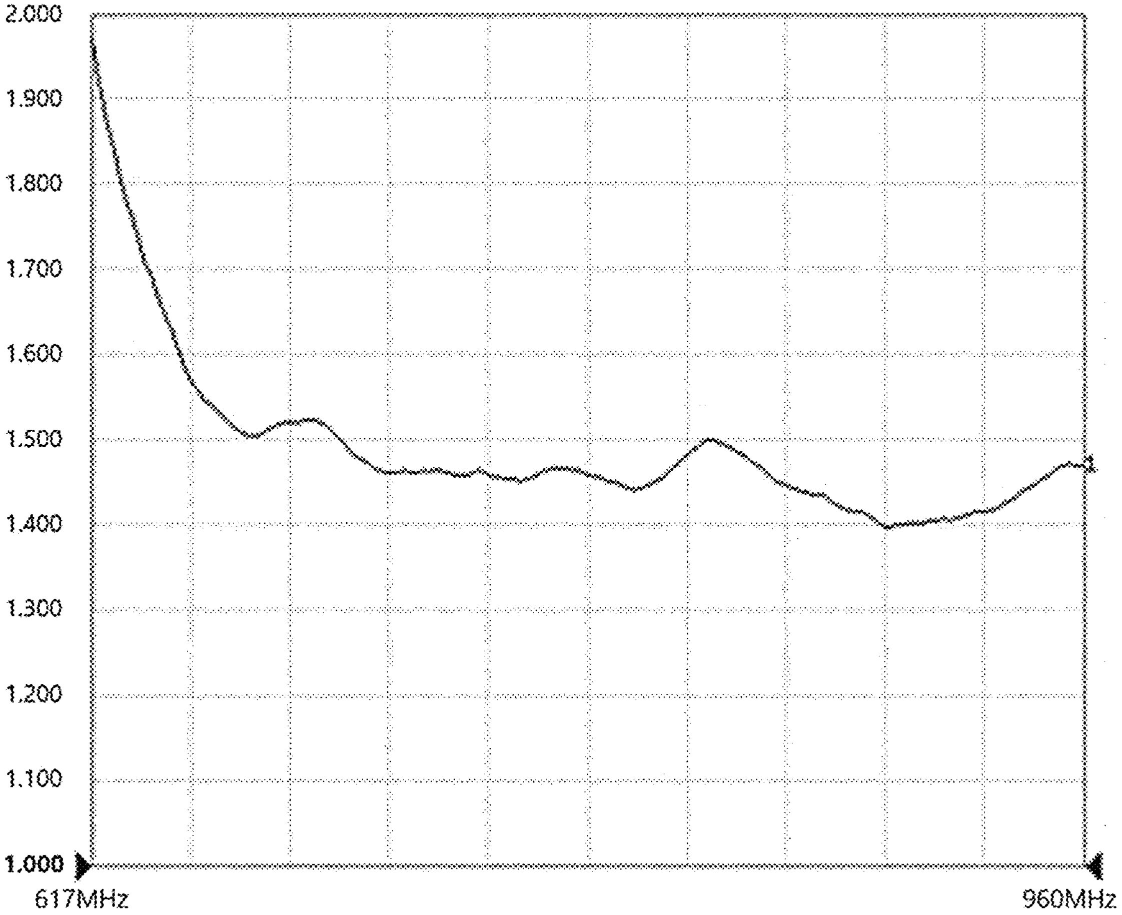
FIG. 7 is a graph showing the S11 parameter of the second reference antenna.

FIG. 7 is a graph showing the S11 parameter of the second reference antenna. The graph of FIG. 7 is also a graph showing the S11 parameter of the low-frequency band among the radiation bands of the second reference antenna.

Referring to FIG. 7, it can be seen that the second reference antenna has a relatively high value of the S11 parameter in the low frequency band and good impedance matching is not achieved.

In turn, it can be seen that when forming a loop by placing two connection lines at the longitudinal end portions of the ground patterns, a good impedance matching can be secured by lowering the standing wave ratio in the low-frequency band.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A multiple-input and multiple-output (MIMO) antenna, comprising:

a substrate;

a first feed line and a second feed line formed on a front side of the substrate and spaced apart from each other;

a first radiator receiving a feed signal from the first feed line;

a second radiator spaced apart from the first radiator by a predetermined distance and receiving a feed signal from the second feed line;

a first ground pattern surrounding the first feed line, electrically connected to a ground, and extending in a longitudinal direction of the substrate;

a second ground pattern spaced apart from the first ground pattern by a predetermined distance, surrounding the second feed line, electrically connected to the ground, and extending in the longitudinal direction of the substrate;

a first connection line connecting the first ground pattern and the second ground pattern in an area adjacent to a first longitudinal end of the first ground pattern and the second ground pattern;

a first protrusion pattern protruding in the longitudinal direction of the first ground pattern from the first longitudinal end of the first ground pattern;

a second protrusion pattern protruding in the longitudinal direction of the second ground pattern from the first longitudinal end of the second ground pattern;

a second connection line connecting the first protrusion pattern and the second protrusion pattern; and a connection element having a length of λ/2, electrically connecting the first radiator and the second radiator.

2. The MIMO antenna according to claim 1, wherein an electrical loop is formed by the first connection line and the second connection line.

3. The MIMO antenna according to claim 1, wherein, on a rear side of the substrate, a first feed point connected to the first feed line through a first via hole and a second feed point connected to the second feed line through a second via hole are formed.

4. A multiple-input and multiple-output (MIMO) antenna, including:

a substrate;

a first feed line and a second feed line formed on a front side of the substrate and spaced apart from each other;

a first radiator receiving a feed signal from the first feed line;

a second radiator spaced apart from the first radiator by a predetermined distance and receiving a feed signal from the second feed line;

a first ground pattern surrounding the first feed line, electrically connected to a ground, and extending in a longitudinal direction of the substrate;

a second ground pattern spaced apart from the first ground pattern by a predetermined distance, surrounding the second feed line, electrically connected to the ground, and extending in the longitudinal direction of the substrate;

a first connection line connecting the first ground pattern and the second ground pattern;

a second connection line connecting the first ground pattern and the second ground pattern and formed lower than the first connection line; and a connection element having a length of λ/2, electrically connecting the first radiator and the second radiator.

5. The MIMO antenna according to claim 4, wherein an electrical loop is formed by the first connection line and the second connection line.

6. The MIMO antenna according to claim 4, wherein the first connection line and the second connection line are formed in an area adjacent to a first longitudinal end of the first ground pattern and the second ground pattern.

7. The MIMO antenna according to claim 4, wherein, on a rear side of the substrate, a first feed point connected to the first feed line through a first via hole and a second feed point connected to the second feed line through a second via hole are formed.

* * * * *